United States Patent
Iwamoto et al.

(10) Patent No.: US 6,958,198 B2
(45) Date of Patent: Oct. 25, 2005

(54) NON-AQUEOUS ELECTROCHEMICAL APPARATUS

(75) Inventors: Kazuya Iwamoto, Sakai (JP); Takafumi Oura, Hirakata (JP); Kumiko Sonoda, Hirakata (JP); Makino Hatazaki, Osaka (JP); Hiroshi Yoshizawa, Hirakata (JP); Shinji Nakanishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 430 days.

(21) Appl. No.: 09/901,130

(22) Filed: Jul. 10, 2001

(65) Prior Publication Data

US 2002/0039677 A1 Apr. 4, 2002

(30) Foreign Application Priority Data

| Jul. 17, 2000 | (JP) | .................................... | 2000-215518 |
| Jul. 17, 2000 | (JP) | .................................... | 2000-215519 |
| Jul. 17, 2000 | (JP) | .................................... | 2000-215520 |

(51) Int. Cl.[7] ........................................... H01M 10/40
(52) U.S. Cl. ...................... 429/122; 429/199; 429/200; 429/331; 429/332; 429/336; 429/337; 429/338
(58) Field of Search .............................. 429/188, 200, 429/203, 323, 326, 331, 336, 337, 338, 250, 122

(56) References Cited

U.S. PATENT DOCUMENTS 5,358,801 A 10/1994 Brodd

FOREIGN PATENT DOCUMENTS

| EP | 0457354 A1 | 11/1991 |
| FR | 2704099 | * 10/1994 |
| JP | 04204522 | 7/1992 |
| JP | 4322060 | 11/1992 |
| JP | 5335018 | 12/1993 |
| JP | 07-153467 | * 6/1995 |
| JP | 07282851 | 10/1995 |
| JP | 09092280 | 4/1997 |
| JP | 09106834 | 4/1997 |
| JP | 09161844 | 6/1997 |
| JP | 63236258 | 10/1998 |
| JP | 11354104 | 12/1999 |
| JP | 2001060464 | 3/2001 |
| WO | 9916138 | 4/1999 |
| WO | 9930381 | 6/1999 |

OTHER PUBLICATIONS

European Search Report dated Nov. 28, 2001, published in EP 1174940 A1, Jan. 23, 2002.
Patent Abstracts of Japan; vol. 2000, No. 06, Sep. 22, 2000 & JP 2000 082471 A (Shin Kobe Electric Mach Co Ltd), Mar. 21, 2000 *abstract*.
Patent Abstracts of Japan; vol. 1998, No. 03, Feb. 27, 1998, & JP 09 306539 A (Sanyo Electric Co Ltd), Nov. 28, 1997 *abstract*.

* cited by examiner

*Primary Examiner*—Jonathan Crepeau
(74) *Attorney, Agent, or Firm*—Stevens, Davis, Miller & Mosher, LLP

(57) ABSTRACT

The invention relates to a non-aqueous electrochemical apparatus in which the difference ($\gamma l - \gamma se$) between the surface tension $\gamma l$ of non-aqueous electrolyte and the surface free energy $\gamma se$ of electrode is not more than 10 dynes/cm.

27 Claims, 1 Drawing Sheet

FIG. 1

NON-AQUEOUS ELECTROCHEMICAL APPARATUS

BACKGROUND OF THE INVENTION

The present invention relates to a non-aqueous electrochemical apparatus using a non-aqueous electrolyte. More particularly, it relates to a non-aqueous electrolyte lithium secondary battery.

Non-aqueous electrochemical apparatuses using light metals such as lithium and sodium as negative electrode active materials are used in a wide variety of the fields such as of various electric and electronic equipment. Non-aqueous electrochemical apparatuses include batteries, capacitors for electric double layers, electrolytic capacitors and the like. Especially, non-aqueous electrolyte secondary batteries are being intensively investigated and developed at present because they are rechargeable batteries which have high energy density and can be miniaturized and weight-saved.

Non-aqueous electrolyte secondary batteries are composed of positive electrodes, negative electrodes, a non-aqueous electrolyte, and separators separating the positive electrode and the negative electrode from each other.

As the positive electrode active materials, there are used lithium cobaltate ($LiCoO_2$), lithium nickelate ($LiNiO_2$), lithium manganate ($LiMn_2O_4$, $LiMnO_2$) and lithium ferrate ($LiFeO_2$), and these compounds in which a part of their transition metals (Co, Ni, Mn, Fe) is replaced with other transition metals, tin (Sn), aluminum (Al), and the like; transition metal oxides such as vanadium oxide ($V_2O_5$), manganese dioxide ($MnO_2$) and molybdenum oxide ($MoO_2$, $MoO_3$); transition metal sulfides such as titanium sulfide ($TiS_2$), molybdenum sulfide ($MOS_2$, $MoS_3$) and iron sulfide ($FeS_2$); and the like. In preparing positive electrode using these positive electrode materials, carbon black is added as a conducting agent for compensation of low electronic conductivity of the positive electrode active materials and, simultaneously, for enhancement of electrolyte retainability in the electrode plates.

As the negative electrode active materials, lithium ion or sodium ion is used, and as negative electrode host materials, there are used graphite materials such as amorphous carbon materials, artificial graphite fired at a temperature of 2000° C. or higher, and natural graphite; alkali metals or alloys of alkali metals with aluminum (Al), lead (Pb), tin (Sn), bismuth (Bi), silicon (Si), and the like; cubic system intermetallic compounds which can intercalate alkali metal between their crystal lattices (AlSb, $Mg_2Si$, $NiSi_2$); lithium nitrogen compounds ($Li_{(3-x)}M_xN$ (M=transition metal)); and the like.

Recently, non-aqueous electrolyte secondary batteries using for negative electrodes the above host materials capable of absorbing and releasing alkali metal ions have a greater part of these kinds of batteries.

As the solvents for the electrolytes, there are mainly used cyclic carbonate esters such as propylene carbonate (PC) and ethylene carbonate (EC), chain carbonate esters such as diethyl carbonate (DEC) and dimethyl carbonate (DMC), cyclic carboxylate esters such as γ-butyrolactone (GBL) and γ-valerolactone (GVL), chain ethers such as dimethoxymethane (DMM) and 1,3-dimethoxypropane (DMP), cyclic esters such as tetrahydrofuran (THF) and 1,3-dioxolan (DOL), and the like.

In using these solvents for non-aqueous electrolyte secondary batteries, they are preferably high in electrical conductivity. For this purpose, solvents high in specific permittivity and low in viscosity are preferred. However, to have a high specific permittivity means to have a strong polarity and a high viscosity. Therefore, in the electrolytes of the present practical batteries, there are mainly used in combination the high permittivity solvents such as ethylene carbonate (permittivity $\epsilon=90$) and low permittivity solvents such as dimethyl carbonate (DMC, $\epsilon=3.1$) and ethylmethyl carbonate (EMC, $\epsilon=2.9$).

As electrolytes used in non-aqueous electrolyte batteries, there are used those which are prepared by dissolving a solute of about 1 mol in concentration in the above solvent. As the solute, there are used inorganic acid anion lithium salts such as lithium perchlorate ($LiClO_4$), lithium borofluoride ($LiBF_4$) and lithium phosphofluoride (LiPF6), and organic acid anion lithium salts such as lithium trifluoromethanesulfonate ($LiSO_3CF_3$) and lithium bistrifluoromethanesolfonimide ($(CF_3SO_2)_2NLi$).

Furthermore, recently, completely solid polymer electrolytes or so-called gelled polymer electrolytes comprising a polymer matrix into which said electrolyte is incorporated are also often used.

Separators are those which are insoluble in the above non-aqueous electrolytes, and, for example, porous films made of polyethylene or polypropylene are used.

As to surface active agents, it has been proposed to add surface active agents to positive electrode or negative electrodes (JP-A-63-236258, JP-A-5-335018). However, when surface active agents are added to positive electrodes or negative electrodes, volume energy density or weight energy density of these electrodes lowers to cause deterioration of charge and discharge characteristics.

It has been proposed to add to non-aqueous solvents a nonionic surface active agent having an HLB (hydrophilic-lipophilic balance) of not more than 15, for example, polyoxyethylenephenyl ether, in an amount of $1 \times 10^{-5-3} \times 10^{-1}$ mol/liter (JP-A-9-161844). In this case, diffusibility of ions such as lithium ion can be improved and load characteristics of batteries can be improved without causing much decrease of energy density of the batteries. However, in these batteries, cycle life is also apt to become insufficient and amount of evolved gases is relatively large.

In addition, as for zinc alkaline batteries, a technique is disclosed in which surface active agents are added to alkaline electrolytes (aqueous solutions) to improve corrosion resistance of zinc alloys used in the batteries (JP-A-4-322060).

BRIEF SUMMARY OF THE INVENTION

Carbon blacks and graphite materials used in non-aqueous electrochemical apparatuses are very low in wettability with the above-mentioned electrolytes. This is because the surface free energy of graphite materials is 2–10 dynes/cm while the surface tension of electrolytes including polymer electrolytes is 30–50 dynes/cm. If the wettability of electrode materials with electrolytes is low, an electrode reaction does not take place uniformly, resulting in deterioration of storage characteristics and high rate discharge characteristics. Moreover, since the surface free energy of polyethylene or polypropylene used for separators is about 30 dynes/cm, the separators cannot be completely wet with some electrolytes. In many of non-aqueous electrochemical apparatuses represented by lithium ion secondary batteries, the electrodes are porous electrodes since powders such as positive electrode active material, negative electrode active material and carbon black are kneaded together with a binder to prepare a paste and this paste is coated on a plate-like metallic current collector or is pressed into a net-like metal current collector. Therefore, in order to realize a uniform and rapid electrode reaction, the electrolyte must rapidly penetrate into pores of the porous electrodes. However, penetration due to capillary phenomenon hardly occurs in the case of an electrolyte of high surface tension. This is because an electrolyte usually penetrates into pores with its end surface being in the form of concave while end surface of an electrolyte of high surface tension is in the convex form (hemisphere) before penetrating into pores. As a result, the electrode reaction takes place only at the portions which slightly contact with the electrolyte, and, hence, the active material is locally in the overcharged or overdischarged state. Thus, crystal structure of the active material is damaged or the electrolyte decomposes to evolve gases, resulting in deterioration of life characteristics, storage characteristics and high rate discharge characteristics.

As a result of investigation conducted by the inventors on electrolyte conditions under which the electrolyte can uniformly "wet" the electrode materials used for non-aqueous electrochemical apparatuses, it has been found that the electrodes and the separators can almost be wetted when the difference between the surface tension of the non-aqueous electrolyte and the surface free energy of solid elements such as electrodes and separators is not more than 10 dynes/cm.

The above can be realized by controlling the surface tension of the electrolyte. The control can be performed, for example, by adding surface active agents, and it is preferred to add fluorine-containing surface active agents which are electrochemically and thermally stable.

As the fluorine-containing surface active agents, mention may be made of fluoroalkyl(C2–C20)-carboxylic acids, disodium N-perfluorooctanesulfonylglutamate, sodium 3-[fluoroalkyl(C6–C11)oxy]-1-alkyl(C3–C4)sulfonate, sodium 3-[ω-fluoroalkanoyl(C6–C8)-N-ethylamino]-1-propanesulfonanate, N-[3-(perfluorooctanesulfonamide)propyl]-N,N-dimethyl-N-carboxymethylene ammonium betaine, perfluoroalkylcarboxylic acids (C7–C13), perfluorooctanesulfonic acid diethanolamide, perfluoroalkyl(C4–C12)sulfonates (Li, Na, K), N-propyl-N-(2-hydroxyethyl)perfluorooctanesulfonamide, perfluoroalkyl(C6–C10)sulfonamidopropyltrimethylammonium salts, perfluoroalkyl(C6–C10)-N-ethylsulfonylglycine salts (K), bis(N-perfluorooctylsulfonyl-N-ethylaminoethyl)phosphate, monoperfluoroalkyl(C6–C16)ethylphosphoric acid esters, and perfluoroalkylethylene oxide adducts.

According to the present invention, wettability of electrodes or separators with electrolyte is enhanced, and, as a result, non-aqueous electrochemical apparatuses excellent in life characteristics, storage characteristics, and high rate discharge characteristics can be provided.

DETAILED DESCRIPTION OF THE INVENTION

The non-aqueous electrochemical apparatus according to the present invention is characterized in that difference between the surface tension of electrolyte and the surface free energy of solid elements (solid elements in the non-aqueous electro-chemical apparatus, such as electrodes and separators) is not more than 10 dynes/cm.

Specifically, the difference ($\gamma l-\gamma se$) between the surface tension $\gamma l$ of electrolyte and the surface free energy $\gamma se$ of electrode is not more than 10 dynes/cm; the difference ($\gamma l-\gamma ss$) between the surface tension $\gamma l$ of electrolyte and the surface free energy $\gamma ss$ of separator interposed between electrodes is not more than 10 dynes/cm; or the difference ($\gamma l-\gamma se$) between the surface tension $\gamma l$ of electrolyte and the surface free energy $\gamma se$ of electrode is not more than 10 dynes/cm and the difference ($\gamma l-\gamma ss$) between the surface tension $\gamma l$ of electrolyte and the surface free energy $\gamma ss$ of separator is not more than 10 dynes/cm.

It is known that the phenomenon that a solid substance is completely wetted with a liquid substance is a phenomenon which occurs when the surface free energy of the solid exceeds the surface tension of the liquid. However, carbon materials, especially graphite, are materials which are strongest in hydrophobic property, namely, small in the surface free energy, and it is very difficult to completely wet them with a fluid substance such as liquid. On the other hand, an electrode reaction proceeds sufficiently when the difference ($\gamma l-\gamma se$ and $\gamma l-\gamma ss$) between the surface tension $\gamma l$ of electrolyte and the surface free energy $\gamma se$ and $\gamma ss$ of electrode plate and separator is not more than 10 dynes/cm.

The above can be realized by controlling the surface tension of electrolyte, and the control is performed, for example, by adding a surface active agent.

1. Surface Active Agents

As preferred surface active agents in the present invention, there may be used anionic surface active agents such as carboxylic acid salts, sulfonic acid salts, sulfuric acid esters and salts, and phosphoric acid esters and salts; cationic surface active agents such as aliphatic amines and quaternary ammonium salts thereof, aromatic quaternary ammonium salts and heterocyclic quaternary ammonium salts; amphoteric surface active agents such as carboxybetaine, sulfobetaine, aminocarboxylic acid salts and imidazoline derivatives; nonionic surface active agents such as polyoxyethylene ether, sugar esters and glycerin esters; and fluorine-containing surface active agents such as perfluoroalkylsulfonates, excluding nonionic surface active agents.

The surface active agents include various types, for example, carboxylic acid salt type such as N-acylamino acid and salts thereof, alkyl ether carboxylic acids and salts thereof and acylated peptides; sulfonic acid salt type such as alkylbenzenesulfonic acids and salts thereof, alkylnaphthalenesulfonic acids and salts thereof and naphthalenesulfonic acid and formalin condensates; sulfuric acid ester salt type such as higher alcohol and sulfuric acid ester salts; aliphatic amine salt type; aliphatic quaternary ammonium salt type; imidazolinium salt type; ether type, ether ester type; ester type; fluorine type; and the like. These surface active agents are exposed to very strong oxidizing and reducing atmospheres in electrochemical apparatuses. Therefore, they are required to be electrochemically stable. Moreover, they must be able to attain very low surface tension for wetting carbon materials such as graphite. From these viewpoints, fluorine-containing surface active agents are especially preferred.

1.1 Fluorine-containing Surface Active Agents

As the fluorine-containing surface active agents, mention may be made of fluoroalkyl(C2–C20)carboxylic acids, disodium N-perfluorooctanesulfonylglutamate, sodium 3-[fluoroalkyl(C6–C11)oxy]-1-alkyl(C3–C4)sulfonate, sodium 3-[ω-fluoroalkanoyl(C6–C8)-N-ethylamino]-1-propanesulfonate, N-[3-(perfluorooctanesulfonamide)propyl]-N,N-dimethyl-N-carboxymethylene ammonium betaine, perfluoroalkylcarboxylic acids (C7–C13), perfluorooctanesulfonic acid diethanolamide, perfluoroalkyl (C4–C12)sulfonates (Li, Na, K), N-propyl-N-(2-hydroxyethyl)perfluorooctanesulfonamide, perfluoroalkyl (C6–C10)sulfonamidopropyltrimethylammonium salts, perfluoroalkyl(C6–C10)-N-ethylsulfonylglycine salts (K), bis(N-perfluorooctylsulfonyl-N-ethylaminoethyl) phosphate, monoperfluoroalkyl(C6–C16)ethylphosphoric acid esters, and perfluoroalkyl ethylene oxide adducts.

Especially preferred are perfluoroalkyl ethylene oxide adducts represented by the following formula (1): $C_nF_{2n+1}SO_2N(C_mH_{2m+1})CH_2CH_2O)(CH_2CH_2O)_lH$ (n is 4–18, m is 1–4, and l is 5–25), or the following formula (2): $C_nF_{2n+1}$—X—$(CH_2$—$CH_2$—$O)_m$—Y [—X— is —CONH— or —$SO_2NR$— (R is an alkyl group of 1–8 carbon atoms), —Y is —H, —OH, —$CH_3$, —$PO_3W_2$ or —$SO_3W$ (W is an alkali metal), n is 3–10, and m is 2–100].

As mentioned hereinafter, $LiCoO_2$ and the like are generally used for the positive electrode active materials in the non-aqueous electrochemical apparatus of the present invention, and carbon materials such as graphite are used as the negative electrode active materials. In this case, generally, the negative electrode active materials tend to become hydrophobic and the positive electrode active materials tend to become hydrophilic. Therefore, in order to allow both the electrodes to sufficiently contact with the non-aqueous electrolyte, surface active agents having both the hydrophilic group and the hydrophobic group are preferred.

Furthermore, in case only the positive electrode is taken up, an active material $LiCoO_2$ and a conducting agent such as acetylene black or graphite are present in the positive electrode, and thus the hydrophilic $LiCoO_2$ and the hydrophobic conducting agent are present together. Therefore, surface active agents which have only one of hydrophobic group or hydrophilic group are sometimes insufficient to improve penetration property of the non-aqueous electrolyte into the positive electrode plate.

In the preferred surface active agents of the present invention mentioned above, $C_nF_{2n+1}$— is a hydrophobic group and —H or —Y is a hydrophilic group, and they possess both the hydrophobic and hydrophilic properties. Therefore, when the surface active agents of the present invention are added to the non-aqueous electrolyte, the electrolyte can be efficiently penetrated into both the electrode plates. Furthermore, it is considered that by combining these groups with —X— and —$(CH_2$—$CH_2$—$O)_m$—, an optimum balance of hydrophilic property and hydrophobic property for improving the above-mentioned wettability is realized.

—$SO_2NR$— is preferred as X and —H is preferred as Y. Accordingly, surface active agents shown by the following formula (5) are preferred.

(5)

As R in X, mention may be made of methyl group, ethyl group, n-propyl group, iso-propyl group, and the like, and n-propyl group is preferred. Accordingly, surface active agents shown by the following formula (6) are particularly preferred.

(6)

Moreover, n is preferably 3–10, especially preferably 8, and m is preferably 2–30, especially preferably 21.

Amount of the surface active agent added to 100 parts by weight of the non-aqueous electrolyte is not particularly limited and is optionally set, but is preferably 0.001–5 parts by weight, more preferably 0.05–0.5 part by weight.

By the addition of the surface active agents, wettability between the non-aqueous electrolyte and the electrode is improved and diffusibility of ions at the interface is increased, whereby electrochemical apparatuses which are high in load characteristics, less in evolution of gases, and excellent in charge and discharge characteristics and cycle life with keeping high energy density can be provided. These electrochemical apparatuses are good in discharge characteristics at a great current and can also be suitably utilized for devices which require a large current.

1.2 Carbonic Acid Ester Additives and Sulfur Compound Additives

From the viewpoint of further increase of the effect to inhibit evolution of gases, it is preferred to add at least one compound selected from the group consisting of carbonic acid ester additives and sulfur compound additives together with the above-mentioned surface active agents. It is considered that the carbonic acid ester additives have an effect to diminish gases evolved at the surface of negative electrodes, such as $H_2$ and $CH_4$, by the formation of a film, and the sulfur compound additives have an effect to diminish gases evolved at the surface of positive electrodes, such as $CO_2$, by the formation of a film.

When the surface active agent and these additives are used in combination, these additives uniformly spread over the surface of negative electrode or positive electrode to further increase the effect to inhibit evolution of gases at the electrodes.

Examples of the carbonic acid ester additives are vinylene carbonate, phenylethylene carbonate, phenylvinylene carbonate, diphenylvinylene carbonate, trifluoropropylene carbonate, chloroethylene carbonate, methoxypropylene carbonate, vinylethylene carbonate, catechol carbonate, tetrahydrofuran carbonate, diphenyl carbonate, and diethyl dicarbonate. These may be used each alone or in combination of two or more. Among these additives, vinylene carbonate, phenylvinylene carbonate and the like are preferred, and vinylene carbonate is especially preferred, because they have a high affinity for the surface active agents and a great effect to inhibit evolution of gases at the surface of negative electrodes.

Examples of the sulfur compound additives are ethylene sulfite, ethylene trithiocarbonate, vinylene trithiocarbonate, catechol sulfite, tetrahydrofuran sulfite, sulfolane, 3-methylsulfolane, sulfolene, propanesultone, and 1,4-butanesultone. These may be used each alone or in combination of two or more. Among these additives, propanesultone, sulfolane, ethylene sulfite, catechol sulfite and the like are preferred, and propanesultone is especially preferred, because they have a high affinity for the surface active agents of the present invention and a great effect to inhibit evolution of gases at the surface of positive electrodes.

Amount of at least one additive selected from the group consisting of the carbonic acid ester additives and the sulfur compound additives is preferably 0.1–10 parts by weight, more preferably 0.5–5 parts by weight in total based on 100 parts by weight of the non-aqueous electrolyte. If the amount of these additives is less than 0.1 part by weight, the effect to inhibit evolution of gases is not improved so much, and if it exceeds 10 parts by weight, the film formed on the electrodes is too thick and discharge characteristics are deteriorated.

In the case of using the carbonic acid ester additive and the sulfur compound additive in combination, the ratio of them (the carbonic acid ester additive: the sulfur compound additive) is preferably 1:9–9:1 because the effects of them can be well balanced.

Amount of the carbonic acid ester additives is preferably 0.1–10 parts by weight, more preferably 0.5–5 parts by weight based on 100 parts by weight of the non-aqueous electrolyte. If the amount of the carbonic acid ester additives is less than 0.1 part by weight, the effect to inhibit evolution of gases from the negative electrode is small, and if it exceeds 10 parts by weight, the film formed on the electrodes is too thick and discharge characteristics are deteriorated.

Amount of the sulfur compound additives is preferably 0.1–10 parts by weight, more preferably 0.5–5 parts by weight based on 100 parts by weight of the non-aqueous electrolyte. If the amount of the sulfur compound additives is less than 0.1 part by weight, the effect to inhibit evolution of gases from the positive electrode is small, and if it exceeds 10 parts by weight, the film formed on the electrodes is too thick and discharge characteristics are deteriorated.

2. Non-aqueous Solvents

In the present invention, the surface tension of the non-aqueous electrolyte is preferably 10–45 dynes/cm. The non-aqueous electrolytes here include liquid electrolytes, gelled electrolytes and solid polymer electrolytes. The liquid non-aqueous electrolytes are those prepared by dissolving solutes in non-aqueous solvents.

Examples of the solvents are cyclic carbonic acid esters such as ethylene carbonate (EC), propylene carbonate (PC), butylene carbonate (BC) and vinylene carbonate (VC), and derivatives of them, chain carbonic acid esters such as dimethyl carbonate (DMC), diethyl carbonate (DEC) and ethylmethyl carbonate (EMC), and derivatives of them, cyclic carboxylic acid esters such as γ-butyrolactone (GBL) and γ-valerolactone (GVL), and derivatives of them, aliphatic or aromatic carboxylic acid esters such as methyl acetate, ethyl acetate, methyl propionate, ethyl butyrate, butyl acetate, n-propyl acetate, isobutyl propionate and benzyl acetate, and derivatives of them, chain ethers such as 1,2-dimethoxymethane (DME), 1,2-diethoxyethane (DEE) and ethoxymethoxyethane (EME), and derivatives of them, cyclic ethers such as tetrahydrofuran and 2-methyltetrahydrofuran, and derivatives of them, and, in addition, non-protonic organic solvents such as dimethyl sulfoxide, 1,3-dioxolan, formamide, acetamide, dimethylformamide, dioxolan, acetonitrile, propylnitrile, nitromethane, ethyl monoglyme, phosphoric acid triesters, trimethoxymethane, dioxolan derivatives, sulfolane, methylsulfolane, 1,3-dimethyl-2-imidazolidinone, 3-methyl-2-oxazolidinone, ethyl ether, 1,3-propanesultone, anisole, dimethyl sulfoxide, and N-methylpyrrolidone.

It is preferred to use ethylene carbonate, propylene carbonate, ethylmethyl carbonate, diethyl carbonate, dimethyl carbonate, γ-butyrolactone, γ-valerolactone, α-acetyl-γ-butyrolactone, α-methyl-γ-butyrolactone, methyl acetate, ethyl acetate, methyl propionate, ethyl butyrate, butyl acetate, n-propyl acetate, isobutyl propionate, benzyl acetate, and the like.

These may be used each alone or in combination of two or more. Among them, ethylene carbonate, propylene carbonate, ethylmethyl carbonate and γ-butyrolactone are preferred from the point of overall characteristics. However, in the case of containing aliphatic carboxylic acid esters, amount of them is preferably not more than 30% by weight, more preferably not more than 20% by weight based on the weight of the whole non-aqueous solvent, taking into consideration the evolution of gases.

Furthermore, for obtaining non-aqueous electrolytes of high electrical conductivity, it is preferred that 80% by volume or more of the whole non-aqueous solvent comprises at least one non-aqueous solvent selected from the group consisting of propylene carbonate (specific permittivity: 64.9) and γ-butyrolactone (specific permittivity: 39.1). Generally, the non-aqueous electrolytes using these solvents are difficult to penetrate into electrodes or separators, but according to the present invention, this problem is solved by the addition of the surface active agents. Therefore, the present invention is especially excellent in that non-aqueous electrolyte secondary batteries better in electrical characteristics than conventional batteries can be obtained with use of non-aqueous electrolytes of high specific permittivity.

As the non-aqueous solvents used in the present invention, those of the following compositions are preferred.

<Non-aqueous Solvent 1>

A non-aqueous solvent comprising 5–50% by volume of ethylene carbonate and 50–95% by volume of ethylmethyl carbonate and being 100% by volume in total.

<Non-aqueous Solvent 2>

A non-aqueous solvent comprising 50–100% by volume of γ-butyrolactone and 0–50% by volume of propylene carbonate and being 100% by volume in total.

<Non-aqueous Solvent 3>

A non-aqueous solvent comprising 50–100% by volume of propylene carbonate and 0–50% by volume of γ-butyrolactone and being 100% by volume in total.

However, when γ-butyrolactone or propylene carbonate is used as a main component, a non-cyclic carbonic acid eater for the purpose of reducing the viscosity or a cyclic carbonic acid ester for the purpose of increasing the permittivity may be added.

2.2 Non-aqueous Cyclic Compound Solvents

As mentioned above, in the present invention, a mixed solvent comprising a cyclic carbonic acid ester such as ethylene carbonate and a chain carbonic acid ester such as ethylmethyl carbonate (for example, the above non-aqueous solvent 1) can be suitably used by the use of the surface active agents.

When a mixed solvent of a cyclic carbonic acid ester and a chain carbonic acid ester is used as the non-aqueous electrolyte, usually, an ester interchange reaction due to the chain carbonic acid ester takes place in the non-aqueous electrolyte to produce alkoxide radicals such as methoxy radical and ethoxy radical as intermediates.

An ester interchange reaction of unsymmetrical chain carbonic acid esters such as ethylmethyl carbonate can be readily elucidated by analysis. However, concerning symmetrical chain carbonic acid esters such as dimethyl carbonate, the ester interchange reaction can hardly be elucidated by analysis because of no change in structure. However, it is considered that an ester interchange reaction also takes place in these symmetrical carbonic acid esters. The radicals produced by the ester interchange reaction are strong nucleophilic reagents and accelerate ring opening and decomposition of a cyclic ester such as ethylene carbonate to cause evolution of gases or dissolution of metal in the positive electrode active material, thereby rupturing the crystal structure to deteriorate characteristics. The dissolution of the positive electrode active material is a conspicuous problem in spinel type lithium manganate.

Furthermore, fluorine-containing inorganic anion salts which are solutes, such as lithium borofluoride and lithium phosphofluoride, react with water contained in a slight amount in the electrolytes and are decomposed to produce hydrofluoric acid. The ester interchange reaction proceeds with an acid or an alkali as a catalyst. Accordingly, the acid matter (hydrofluoric acid) produced above shows a catalytic action to accelerate the ester interchange reaction of the non-aqueous electrolyte, and thus the ester interchange reaction is accelerated. Therefore, as mentioned above, there is a problem that evolution of gases and deterioration of active materials are accelerated to deteriorate repetition charge and discharge characteristics and high-temperature storage characteristics of batteries. The decomposition reaction of lithium phosphofluoride (LiPF$_6$) is shown in the following formulas.

$$LiPF_6 \rightarrow PF_5 + LiF$$

$$PF_5 + H_2O \rightarrow POF_3 + 2HF$$

$$POF_3 + 3H_2O \rightarrow H_3PO_4 + 3HF$$

However, it has been found that when the surface active agents are added, the ester interchange reaction hardly takes place, namely, there is produced substantially no alkoxide groups which are strong nucleophilic reagents, and thus chemical stability of the non-aqueous electrolyte is enhanced, and as a result, deterioration of characteristics caused by evolution of gases during charging and high-temperature storing and dissolution of active material, particularly, metal in the positive electrode material is inhibited.

These inhibition effects are seen especially in electrochemical apparatuses in which a carbon material capable of absorbing and releasing lithium is used for negative electrode, a lithium-containing transition metal oxide is used for positive electrode, and a solution prepared by dissolving a solute containing lithium as a cation component in a solvent containing a plurality of cyclic compounds is used as a non-aqueous electrolyte.

The cyclic compounds are at least two compounds selected from the group consisting of cyclic esters, cyclic ethers and cyclic acid anhydrides and, preferably, the melting point of at least one of them is −20° C. or lower.

The cyclic esters include cyclic carbonic acid esters, cyclic carboxylic acid esters, cyclic phosphoric acid esters, cyclic phosphorous acid esters, cyclic boric acid esters, cyclic sulfurous acid esters, cyclic sulfuric acid esters, cyclic nitric acid esters, cyclic nitrous acid esters, and cyclic silicic acid esters.

Examples of the cyclic carbonic acid esters are ethylene carbonate, propylene carbonate, butylene carbonate, vinylene carbonate, 1,3-dioxane-2-one and derivatives of these compounds. Examples of the cyclic carboxylic acid esters are γ-butyrolactone, γ-valerolactone, γ-caprolactone, β-propiolactone, 6-hexanolactone, γ-heptanolactone, butenolide, and derivatives of these compounds.

As the cyclic phosphoric acid esters, there may be used, for example, ethylene phosphate and derivatives thereof, and as the cyclic phosphorous acid esters, there may be used, for example, ethylene phosphite and derivatives thereof. Phosphoric acid esters and phosphorous acid esters are generally high in flash point, and have an additional effect to promote flame-retardation of electrolyte and are preferred from this point.

As the cyclic boric acid esters, there may be used, for example, trimethylene borate, 2-butoxy-4,4,6-trimethyl-1,3,2-dioxaborinane, and derivatives of these compounds.

As the cyclic sulfuric acid esters, there may be used, for example, 4,5-diphenyl-(1,3,2)dioxathiol-2,2-dioxide, 1,3-butanediol cyclic sulfate, and derivatives of these compounds. As the cyclic sulfurous acid esters, there may be used, for example, propanesultone and derivatives thereof.

As the cyclic ethers, there may be used, for example, tetrahydrofuran, tetrahydropyran and derivatives of these compounds. The cyclic ethers represented by tetrahydrofuran are strong against electrochemical reduction, and reductive decomposition of the solvent hardly occurs on the negative electrode. Therefore, they are preferably used for electrolytes of lithium secondary batteries which use, as negative electrode, metallic lithium, lithium alloys or carbon materials capable of absorbing and releasing lithium.

Furthermore, as the cyclic acid anhydrides, there may be used, for example, itaconic anhydride, glutaric anhydride, citraconic anhydride, phthalic anhydride, methylnadic anhydride, succinic anhydride, maleic anhydride, pyromellitic dianhydride, 1,2-dicyclohexanedicarboxylic anhydride, 1,8-naphthalic anhydride, homophthalic anhydride, diphenic anhydride, isatoic anhydride, and derivatives of these compounds.

Some of these compounds such as ethylene carbonate and vinylene carbonate have a high melting point, and these high melting point compounds can be used even at low temperatures of 0° C. or lower without any troubles if they are mixed with cyclic compounds having a low melting point of −20° C. or lower.

3. Solutes

As the solutes, mention may be made of, for example, LiClO$_4$, LiBF$_4$, LiPF$_6$, LiAlCl$_4$, LiSbF$_6$, LiSCN, LiCF$_3$SO$_3$, LiCF$_3$CO$_2$, Li(CF$_3$SO$_2$)$_2$, LiN(CF$_3$SO$_2$)$_2$, LiAsF$_6$, LiB$_{10}$Cl$_{10}$, lower aliphatic lithium carboxylates, LiCl, LiBr, LiI, borates such as chloroborane lithium, lithium bis(1,2-benzenedioleate(2-)-O,O')borate, lithium bis(2,3-naphthalenedioleate(2-)-O,O')borate, lithium bis(2,2'-biphenyldioleate(2-)-O,O')borate and lithium bis(5-fluoro-2-oleate-1-benzenesulfonic acid-O,O')borate, and imide salts such as lithium bistrifluoromethanesulfonimide ((CF$_3$SO$_2$)$_2$NLi), lithium tetrafluoromethanesulfonic acid nonafluorobutanesulfonimide (LiN(CF$_3$SO$_2$)(C$_4$F$_9$SO$_2$)), and lithium bispentafluoroethanesulfonimide ((C$_2$F$_5$SO$_2$)$_2$NLi). These may be used each alone or in combination of two or more in the electrolyte and others.

Among them, the organic acid anion type lithium salts are superior in heat stability to inorganic acid anion type lithium salts such as lithium perchlorate and lithium phosphofluoride, and these solutes do not undergo heat decomposition during the use at high temperatures or the storage at high temperatures and do not cause deterioration of characteristics of batteries. Thus, they are preferred.

Furthermore, preferred is combination of one of lithium hexafluorophosphate (LiPF$_6$) and lithium tetrafluoroborate (LiBF$_4$) with lithium bistrifluoromethanesulfonimide ((CF$_3$SO$_2$)$_2$NLi).

The lithium bistrifluoromethanesulfonimide ((CF$_3$SO$_2$)$_2$NLi) having the following structural formula shows a withstand voltage of 0 V against reductive decomposition and a withstand voltage of 4.7 V against oxidative decomposition on a platinum electrode in respect to a lithium reference electrode.

Furthermore, lithium bispentafluoroethanesulfonimide ((C$_2$F$_5$SO$_2$)$_2$NLi) having the following structural formula shows a withstand voltage of 0 V against reductive decomposition and a withstand voltage of 4.7 V against oxidative decomposition on a platinum electrode in respect to a lithium reference electrode.

Moreover, lithium bis(5-fluoro-2-oleate-1-benzenesulfonic acid-O,O')borate shows a withstand voltage of 0 V against reductive decomposition and a withstand voltage of 4.5 V against oxidative decomposition on a platinum electrode in respect to a lithium reference electrode, and lithium bis(2,2'-biphenyldioleate(2-)-O,O') borate shows a withstand voltage of 0 V against reductive decomposition and a withstand voltage of 4.1 V or higher against oxidative decomposition on a platinum electrode in respect to a lithium reference electrode. Therefore, it is preferred for attaining high energy density of batteries to apply these organic acid anion lithium salts to active materials which generate a high voltage of 4 V or higher in respect to a lithium reference electrode, such as lithium cobaltate, lithium nickelate and lithium manganate.

On the other hand, lithium bis(1,2-benzenedioleate(2-)-O,O')borate shows a withstand voltage of 0 V against reductive decomposition and a withstand voltage of 3.6 V against oxidative decomposition on a platinum electrode in respect to a lithium reference electrode, and lithium bis(2, 3-naphthalenedioleate(2-)-O,O')borate shows a withstand voltage of 0 V against reductive decomposition and a withstand voltage of 3.8 V against oxidative decomposition on a platinum electrode in respect to a lithium reference electrode. When electrolytes in which these solutes are dissolved are applied to active materials which generate a high voltage of 4 V or higher in respect to a lithium reference electrode, such as lithium cobaltate, lithium nickelate and lithium manganate, decomposition of the solutes is caused. However, transition metal sulfides such as titanium lithium disulfide (LiTiS$_2$) and molybdenum lithium sulfide (LiMoS$_2$) which show electromotive force of about 3 V in respect to a lithium reference electrode can be used in the above potential region.

The solute is dissolved in the non-aqueous solvent to prepare a non-aqueous electrolyte. Amount of the solute dissolved in the non-aqueous solvent is not particularly limited, but is preferably 0.2–2 mols/l, especially preferably 0.5–1.5 mol/l.

The non-aqueous electrolyte may be a gelled electrolyte or a polymeric solid electrolyte. The gelled electrolyte is prepared by incorporating the above liquid non-aqueous electrolyte into a resin matrix to make a jelly-like electrolyte. The resins used here include, for example, polyethylene oxide, polyvinylidene fluoride, polyacrylonitrile, polyurethane, polymethyl methacrylate, and polyethyl methacrylate. As the polymeric solid electrolytes, there may be used those which are prepared by dissolving the above solutes in polyethylene oxide, polypropylene oxide or copolymers thereof. Furthermore, various known additives can be added to these electrolytes to improve cycle characteristics, high rate discharge characteristics and storage characteristics.

Amount of the non-aqueous electrolyte added to battery is not particularly limited, and the electrolyte can be used in a necessary amount depending on amounts of positive electrode materials, negative electrode materials and size of batteries.

4. Negative Electrode Materials

The positive electrodes and negative electrodes used in the lithium secondary battery of the present invention are those which are made by coating on a current collector a mix layer comprising a positive electrode active material and a negative electrode material which have a surface free energy of preferably 1–35 dynes/cm and capable of electrochemically and reversibly absorbing and releasing lithium ion together with a conducting agent, a binder and the like. In the present invention, solid materials of positive electrode, negative electrode and separator are called solid elements, and the surface free energy of them is preferably 1–35 dynes/cm.

The negative electrode materials are constructed using metallic lithium or materials capable of doping and dedoping lithium. As the materials capable of doping and dedoping lithium, mention may be made of, for example, carbon materials such as pyrolytic carbons, cokes (pitch cokes, needle cokes, petroleum cokes, and the like), graphites, glassy carbons, organic polymer compound fired products (those obtained by firing phenolic resin, furan resin and the like at a suitable temperature to carbonize the resins), carbon fibers and active carbon, polymers such as polyacetylene, polypyrrole and polyacene, lithium-containing transition metal oxides or transition metal sulfides such as Li$_{4/3}$Ti$_{5/3}$O$_4$, TiS$_2$, etc., alkali metals or alloys of alkali metals with aluminum (Al), lead (Pb), tin (Sn), bismuth (Bi) and silicon (Si), and the like, cubic system intermetallic compounds which can intercalate alkali metal between their crystal lattices (AlSb, Mg$_2$Si, NiSi$_2$), lithium nitrogen compounds (Li$_{(3-x)}$M$_x$N (M: transition metal), and the like. These negative electrode materials may be used in admixture.

The conducting agents for negative electrodes used in the present invention may be any materials as far as they are electron conductive materials. Examples thereof are graphites such as natural graphites (flaky graphite, etc.) and artificial graphites, carbon blacks such as acetylene black, ketjen black, channel black, furnace black, lamp black and thermal black, conductive fibers such as carbon fibers and metallic fibers, metal powders such as carbon fluoride, copper and nickel, organic conductive materials such as polyphenylene derivatives, and the like. These may be used each alone or in admixture of two or more. Of these conducting agents, artificial graphite, acetylene black and carbon fibers are especially preferred. Amount of the conducting agents is not particularly limited, but is preferably 1–50% by weight, especially preferably 1–30% by weight. Since the negative electrode materials of the present invention per se have electron conductivity, the conducting agent may not be used for performing functions as the batteries.

The binders for negative electrodes used in the present invention may be any of thermoplastic resins and thermosetting resins. Preferred in the present invention are, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or (Na$^+$) ion crosslinked product thereof, ethylene-methacrylic acid copolymer or (Na$^+$) ion crosslinked product thereof, ethylene-methyl acrylate copolymer or (Na$^+$) ion crosslinked product thereof, ethylene-methyl methacrylate copolymer or (Na$^+$) ion crosslinked product thereof, and the like. These may be used each alone or as a mixture. Of these materials, more preferred are styrene-butadiene rubber, polyvinylidene fluoride, ethylene-acrylic acid copolymer or (Na$^+$) ion crosslinked product thereof, ethylene-methacrylic acid copolymer or (Na$^+$) ion crosslinked product thereof, ethylene-methyl acrylate copolymer and (Na$^+$) ion crosslinked product thereof, and ethylene-methyl methacrylate copolymer or (Na$^+$) ion crosslinked product thereof, which are stable against electrochemical reduction and relatively small in surface free energy.

The current collectors for negative electrodes used in the present invention may be any collectors as far as they are electron conductors which undergo no chemical change in the fabricated batteries. For example, as materials therefor, there may be used stainless steel, nickel, copper, titanium, carbon, conductive resins, and, in addition, copper or stainless steel the surface of which is treated with carbon, nickel or titanium. Especially preferred are copper or copper alloys. The surface of these materials may be oxidized and used. Desirably, the surface of the current collectors is made irregular by surface treatment. As for the shape of the collectors, there may be used foils, and, besides, films, sheets, nets, punched materials, lathes, porous materials, foamed materials, molded articles of fibers. Thickness is not particularly limited, but is generally 1–500 µm.

5. Positive Electrode Materials

As the positive electrode materials in the present invention, there may be used compounds containing or not containing lithium. Examples thereof are $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_2$, $Li_xMn_2O_4$, $Li_xMn_{2-y}M_yO_4$ (M=at least one of Na, Mg, Sc, Y, Mn, Fe, Co, Ni, Cu, Zn, Al, Cr, Pb, Sb and B) (where x=0–1.2, y=0–0.9, z=2.0–2.3). The value x is one before starting of charging and discharging, and it increases or decreases by charging and discharging. Further, there may also be used other positive electrode active materials such as transition metal chalcogenides, vanadium oxides and lithium compounds thereof, niobium oxides and lithium compounds thereof, conjugated polymers using organic conductive materials, Chevrel phase compounds, and the like. A plurality of different positive electrode active materials may be used in admixture. Average particle diameter of the positive electrode active material particles is not particularly limited, but is preferably 1–30 µm.

The conducting agents for positive electrodes used in the present invention may be any materials as far as they are electron conductive materials which do not undergo chemical change at the charging and discharging potentials of the positive electrodes used. Examples thereof are graphites such as natural graphite (flaky graphite, etc.) and artificial graphite, carbon blacks such as acetylene black, Ketzen black, channel black, furnace black, lamp black and thermal black, conductive fibers such as carbon fibers and metallic fibers, metal powders such as carbon fluoride, copper, nickel, aluminum and silver, conductive whiskers such as zinc oxide and potassium titanate, conductive metal oxides such as titanium oxide, organic conductive materials such as polyphenylene derivatives, and the like. These may be used each alone or in admixture of two or more. Of these conducting agents, artificial graphite, acetylene black and nickel powders are especially preferred. Amount of the conducting agents is not particularly limited, but is preferably 1–50% by weight, especially preferably 1–30% by weight. For carbon or graphite, 2–15% by weight is especially preferred.

The binders for positive electrodes used in the present invention may be any of thermoplastic resins and thermosetting resins. Preferred in the present invention are, for example, polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or (Na$^+$) ion crosslinked product thereof, ethylene-methacrylic acid copolymer or (Na$^+$) ion crosslinked product thereof, ethylene-methyl acrylate copolymer or (Na$^+$) ion crosslinked product thereof, ethylene-methyl methacrylate copolymer or (Na$^+$) ion crosslinked product thereof, and the like.

Of these materials, especially preferred is polyvinylidene fluoride (PVDF) which is high in heat resistance temperature, electrochemically stable and low in surface free energy.

The current collectors for positive electrodes used in the present invention may be any collectors as far as they are electron conductors which do not undergo chemical change at the charging and discharging potentials of the positive electrode materials. For example, as materials therefor, there may be used stainless steel, aluminum, titanium, carbon, conductive resins, and, in addition, aluminum or stainless steel the surface of which is treated with carbon or titanium. Especially preferred are aluminum or aluminum alloys. The surface of these materials may be oxidized. Desirably, the surface of the collectors is made irregular by surface treatment. As for the shape of the current collectors, there may be used foils, and, besides, films, sheets, nets, punched materials, lathes, porous materials, foamed materials, molded products of fibers or nonwoven fabrics. Thickness is not particularly limited, but is generally 1–500 µm.

The electrode mix may contain various additives such as fillers, dispersing agents, ion conducting agents, and others in addition to the conducting agents and binders. The fillers may be any fibrous materials which do not undergo chemical change in a fabricated battery, and, ordinarily, fibers such as of olefin polymers, for example, polypropylene and polyethylene, glass and carbon are used. The amount of fillers is not particularly limited, but is preferably 0–30% by weight, The construction of the negative electrode plate and the positive electrode plate as electrodes in the present invention is preferably such that at least the surface of the mix of the positive electrode faces the surface of the mix of the negative electrode.

6. Separators

As the separator in the present invention, an insulating microporous thin film having a great ion permeability and a given mechanical strength can be used. The separator preferably has a shutdown function of closing the pores at a temperature higher than a given temperature to enhance the resistance. Preferably, the separator has a surface free energy of 1–35 dynes/cm. Examples are sheets, nonwoven fabrics or woven fabrics made from olefin polymers selected from one or combination of polypropylene and polyethylene or glass fibers from the points of organic solvent resistance and hydrophobic properties. Pore diameter of the separator is preferably in such a range that materials of positive and negative electrodes, binders and conducting agents which are released from the electrode sheets do not permeate through the separator. For example, the pore diameter is preferably 0.01–1 μm. Thickness of the separator is generally 10–300 μm. The porosity is determined depending on permeability to electron or ion, materials or film thickness, and is generally 30–80%.

Moreover, it is also possible to make a battery in the following manner. That is, an organic electrolyte comprising a solvent and a lithium salt dissolving in the solvent is absorbed and held in a polymer material and this is contained in the mix of positive electrode and that of negative electrode, and, furthermore, a porous separator comprising a polymer capable of absorbing and holding the organic electrolyte is integrated with the positive electrode and the negative electrode. The above polymer material may be one which can absorb and hold the organic electrolyte, and is especially preferably a copolymer of vinylidene fluoride and hexafluoropropylene.

The shape of batteries may be any of coin type, button type, sheet type, laminate type, cylindrical type, flat type, rectangular type and large-sized type to be used for electric cars.

Furthermore, the non-aqueous electrolyte secondary batteries of the present invention can be used for portable information terminals, portable electronic devices, domestic small-sized power storage devices, automatic two-wheeled vehicles, electric cars, hybrid electric cars, and the like.

EXAMPLES

The present invention will be explained in more detail by the following examples.

Example 1

Measurement of Surface Free Energy of Electrode

Positive electrode A was made by mixing 85% by weight of a lithium cobaltate powder, 10% by weight of a carbon powder as a conducting agent and 5% by weight of a polyvinylidene fluoride resin as a binder, dispersing the mixture in dehydrated N-methyl-pyrrolidinone to prepare a slurry, coating the slurry on a positive electrode current collector comprising an aluminum foil, drying the coat and rolling the coated foil. Positive electrode B was made by dispersing 85% by weight of a lithium cobaltate powder, 10% by weight of a carbon powder as a conducting agent and 5% by weight of polytetrafluoroethylene in an aqueous carboxymethyl cellulose solution to prepare a slurry, coating the slurry on a positive electrode current collector comprising an aluminum foil, drying the coat and rolling the coated foil.

A droplet of each of ethanol (surface tension: 24 dynes/cm), p-xylene (31 dynes/cm), trimethyl phosphate (40 dynes/cm), ethylene glycol (50 dynes/cm), formamide (59 dynes/cm) and water (72 dynes/cm) was dropped on the positive electrodes A and B, and contact angle θ of each of the solvents was measured and cos θ was plotted against the surface tension of the solvents. This plot was linearly approximated, and the value of surface tension when the line crossed at cos θ=1 was taken as the surface free energy of the electrode. The thus obtained surface free energy of the electrode was 28 dyes/cm for positive electrode A and 20 dynes/cm for negative electrode B.

Measurement of Surface Free Energy of Separator

Commercially available five kinds of porous separators made of polyethylene were used in this example. The surface free energy of the separators measured in the same manner as in measurement of the surface free energy of electrode. The results are shown in Table 1.

TABLE 1

| | Surface free energy (dyne/cm) |
|---|---|
| Separator A | 20 |
| Separator B | 24 |
| Separator C | 27 |
| Separator D | 31 |
| Separator E | 34 |

Measurement of Surface Tension of Electrolyte

Ethylene carbonate (EC) and γ-butyrolactone (GBL) were mixed at a volume ratio of 1:3, and lithium hexafluorophosphate ($LiPF_6$) was dissolved in the resulting mixed solvent to prepare 1.2 M of a $LiPF_6$-EC/GBL electrolyte. To the resulting electrolytes were added various surface active agents in the amounts of 0, 0.00001, 0.0001, 0.01, 0.1, 1.0, 2.0 and 5.0 wt %, and surface tension of the electrolytes was measured. The results are shown in Table 2. Furthermore, 0.2 g of a graphite powder having an average particle diameter of 5 μm was added to 50 ml of the above electrolytes, and it was examined whether sedimentation of the graphite powder occurred or not when the electrolytes were left to stand. The results are shown in Table 3.

TABLE 2

| Amount (wt %) | Perfluoroalkyl-(C3)carboxylic acid | Lithium perfluoroalkyl(C4)-sulfonate | N-propyl-N-(2-hydroxyethyl)-perfluoro-octanesulfonamide | Perfluoro-alkylethylene oxide adduct $C_8F_{17}SO_2N(C_3H_7)$—$CH_2CH_2O(CH_2CH_2O)_{10}H$ | Perfluoro-octane-sulfonic acid diethanol-amide |
|---|---|---|---|---|---|
| 0 | 48 | 48 | 48 | 48 | 48 |
| 0.00001 | 48 | 48 | 47 | 46 | 47 |
| 0.0001 | 47 | 45 | 44 | 44 | 44 |
| 0.01 | 39 | 38 | 35 | 33 | 34 |
| 0.1 | 28 | 32 | 31 | 29 | 31 |
| 1.0 | 28 | 26 | 25 | 24 | 24 |
| 2.0 | 28 | 25 | 25 | 23 | 24 |
| 5.0 | 28 | 25 | 25 | 23 | 24 |

TABLE 3

Occurrence of sedimentation of grahite powder

| Amount (wt %) | Perfluoroalkyl-(C3)carboxylic acid | Lithium perfluoro-alkyl(C4)-sulfonate | N-propyl-N-(2-hydroxyethyl)-prefluoro-octanesulfon-amide | Perfluoro-alkylethylene oxide adduct $C_8F_{17}SO_2N(C_3H_7)$—$CH_2CH_2O(CH_2CH_2O)_{10}H$ | Perfluoro-octane-sulfonic acid diethanol-amide |
|---|---|---|---|---|---|
| 0 | No | No | No | No | No |
| 0.00001 | No | No | No | Slight sedimentation | No |
| 0.0001 | No | Slight sedimentation | Slight sedimentation | Slight sedimentation | Slight sedimentation |
| 0.01 | Nearly complete sedimentation | Nearly complete sedimentation | Nearly complete sedimentation | Nearly complete sedimentation | Nearly complete sedimentation |
| 0.1 | Complete sedimentation | Complete sedimentation | Complete sedimentation | Complete sedimentation | Complete sedimentation |
| 1.0 | Complete sedimentation | Complete sedimentation | Complete sedimentation | Complete sedimentation | Complete sedimentation |
| 2.0 | Complete sedimentation | Complete sedimentation | Complete sedimentation | Complete sedimentation | Complete sedimentation |
| 5.0 | Complete sedimentation | Complete sedimentation | Complete sedimentation | Complete sedimentation | Complete sedimentation |

According to this Example, improvement of wettability of the graphite powder with the electrolyte was recognized when the surface tension of the electrolyte reached about 45 dynes/cm or lower by the addition of the surface active agent. A preferred amount of the surface active agent for obtaining the effect to improve the wettability is 0.0001–2.0 wt %.

Example 2
Method of Production of Cylindrical Battery

Figure 1:
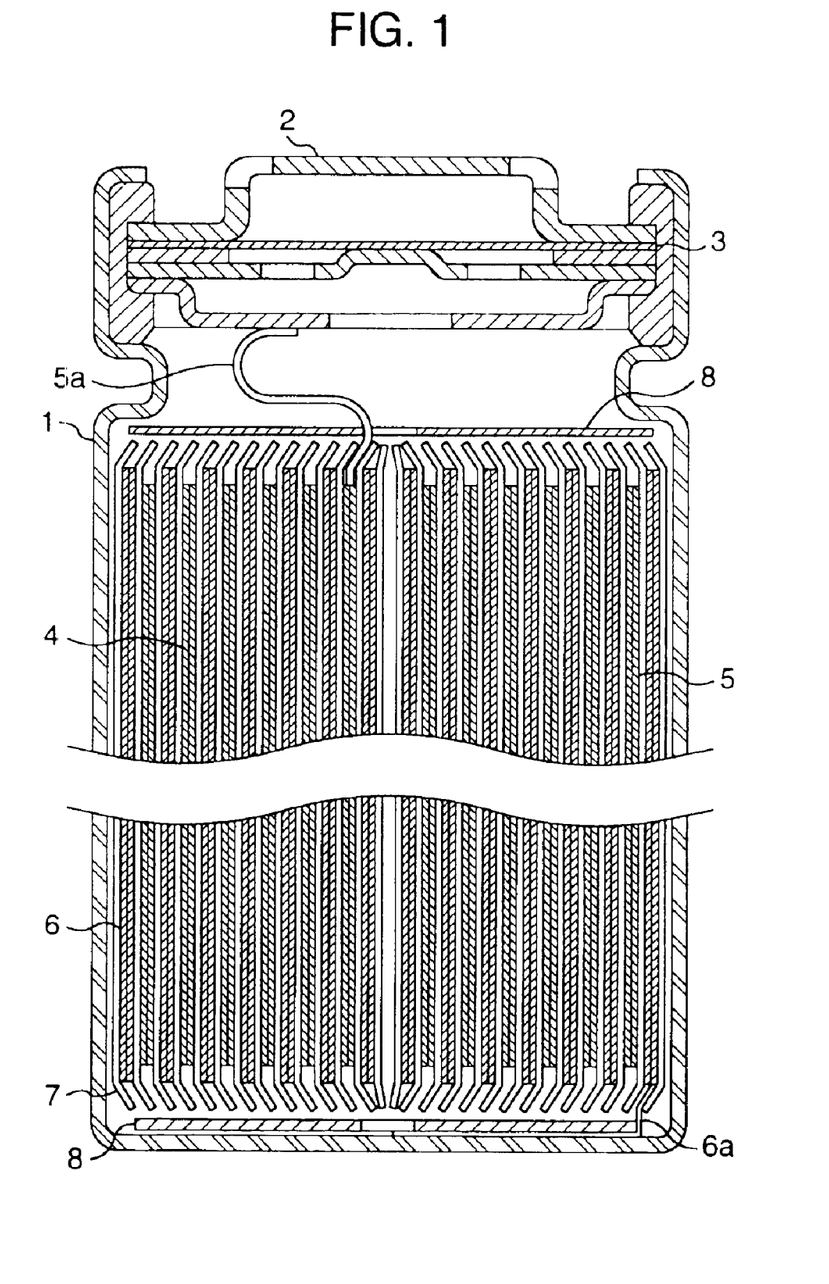
FIG. 1 is a longitudinal sectional view of a cylindrical battery according to one embodiment of the present invention.

FIG. 1 is a longitudinal sectional view of a cylindrical battery of the present invention. A positive electrode 5 and a negative electrode 6 and a separator 7 interposed therebetween are rolled a plurality of times into a spiral form and are inserted in a battery case 1. A positive electrode lead 5a is drawn from the positive electrode 5 and connected to a sealing plate 2, and a negative electrode lead 6a is drawn from the negative electrode 6 and connected to the bottom of the battery case 1. The battery case or lead plate may be made of a metal or metal alloy having organic electrolyte resistance and electron conductivity. For example, there may be used metals such as iron, nickel, titanium, chromium, molybdenum, copper and aluminum, and alloys of these metals. The battery case is most preferably made by working a stainless steel plate or Al—Mn alloy plate, and the positive electrode lead and the negative electrode lead are most preferably made of aluminum and nickel, respectively. For the purpose of weight-saving, various engineering plastics and combination of these plastics with metals can also be used for the battery case. The reference numeral 8 indicates insulating rings, which are provided at the upper part and the lower part of a plate group 4, respectively. An electrolyte is poured thereinto and the battery case is sealed using the sealing plate. In this case, a safety valve can be provided at the sealing plate. In addition to the safety valve, there may be provided various known safety elements. For example, fuse, bimetal, PTC element, and the like are used as over-current prevention elements. Furthermore, in addition to the use of safety valve, a method of providing a notch for the battery case, a method of providing a crack for gasket, a method of providing a crack for the sealing plate, a method of providing a crack for the lead plate or a method of cutting the lead plate can be utilized for the inhibition of rising of internal pressure of the battery case. Moreover, a protective circuit provided with measures against overcharging or over-discharging may be provided in a charging device or may be independently connected to the battery case. In addition, a system for cut-off of current due to rising of internal pressure may also be provided as a measure against overcharging. In this case, a compound which raises internal pressure can be contained in the mix or the electrolyte. Examples of the compound raising the internal pressure are carbonates such as $Li_2CO_3$, $LiHCO_3$, $Na_2CO_3$, $NaHCO_3$, $CaCO_3$ and $MgCO_3$. Cap, battery case, sheet and lead plate can be welded by known methods, for example, DC or AC electric welding, laser welding, ultrasonic welding, and the like. As a sealing agent for sealing, there may be used known compounds or mixtures such as asphalt.

The two kinds of positive electrodes A and B mentioned above were used as the positive electrodes of cylindrical batteries having the above construction.

The negative electrode 6 was made by mixing 75% by weight of an artificial graphite powder, 20% by weight of a carbon powder as a conducting agent and 5% by weight of a polyvinylidene fluoride resin as a binder, dispersing the mixture in dehydrated N-methylpyrrolidinone to prepare a slurry, coating the slurry on a negative electrode current collector comprising a copper foil, drying the coat and then rolling the coated foil.

Leads were spot welded to the thus obtained positive electrode and negative electrode, respectively, and thereafter each of the five kinds of porous separators made of polyethylene shown in Table 1 was interposed between the electrodes which were disposed opposite to each other. These were rolled to form a jelly roll type electrode group.

Ethylene carbonate (EC) and γ-butyrolactone (GBL) were mixed at a volume ratio of 1:3, and lithium hexafluorophosphate ($LiPF_6$) was dissolved in the resulting mixed solvent to prepare 1.2 M of a $LiPF_6$-EC/GBL electrolyte. To the resulting electrolytes were added $C_8F_{17}SO_2N(C_3H_7)$ $CH_2CH_2O(CH_2CH_2O)_{10}H$ as a surface active agent in the amounts of 0, 0.00001, 0.0001, 0.01, 0.1, 1.0, 2.0 and 5.0 wt %. Each of these electrolytes was poured in the battery cases in which the electrode plate group was inserted and the case was sealed by the sealing plate.

The resulting cylindrical batteries had a diameter of 18 mm, a height of 65 mm and a design capacity of 1600 mAh.

The batteries were charged at a constant voltage of 4.2 V, and then discharged at a discharge current of 0.2C and 2C, and the discharge capacity ratios obtained are shown in Table 4.

Moreover, after the discharging at 2C, charging at a constant voltage of 4.2 V was again carried out, and then the batteries were stored at 60° C. for 1 month. These batteries were discharged at a discharge current of 2C, and the results are shown by the ratio to the 2C capacity before being stored in Table 5.

TABLE 4

| Amount (wt %) | Kind of electrode plate | Ratio of high rate discharge capacity (%) | | | | |
|---|---|---|---|---|---|---|
| | | Separator A | Separator B | Separator C | Separator D | Separator E |
| 0 | A | 58 | 61 | 64 | 67 | 69 |
| | B | 53 | 55 | 60 | 64 | 66 |
| 0.00001 | A | 66 | 68 | 70 | 71 | 72 |
| | B | 63 | 65 | 66 | 67 | 68 |
| 0.0001 | A | 69 | 71 | 73 | 74 | 76 |
| | B | 67 | 68 | 69 | 71 | 72 |
| 0.01 | A | 74 | 78 | 80 | 81 | 82 |
| | B | 70 | 72 | 74 | 77 | 79 |
| 0.1 | A | 82 | 85 | 85 | 86 | 87 |
| | B | 80 | 84 | 84 | 85 | 85 |
| 1.0 | A | 88 | 90 | 90 | 90 | 90 |
| | B | 86 | 90 | 90 | 90 | 87 |
| 2.0 | A | 88 | 91 | 91 | 92 | 93 |
| | B | 86 | 91 | 91 | 92 | 92 |
| 5.0 | A | 88 | 88 | 89 | 91 | 93 |
| | B | 86 | 91 | 91 | 92 | 92 |

TABLE 5

| Amount (wt %) | Kind of electrode plate | Ratio of 2C discharge capacity before and after storing (%) | | | | |
|---|---|---|---|---|---|---|
| | | Separator A | Separator B | Separator C | Separator D | Separator E |
| 0 | A | 59 | 62 | 65 | 68 | 70 |
| | B | 54 | 56 | 61 | 65 | 67 |
| 0.00001 | A | 67 | 69 | 71 | 72 | 73 |
| | B | 64 | 66 | 67 | 68 | 69 |
| 0.0001 | A | 70 | 72 | 74 | 75 | 77 |
| | B | 68 | 69 | 70 | 72 | 73 |
| 0.01 | A | 75 | 79 | 81 | 82 | 83 |
| | B | 71 | 73 | 75 | 78 | 80 |
| 0.1 | A | 83 | 86 | 86 | 87 | 88 |
| | B | 81 | 85 | 85 | 86 | 86 |
| 1.0 | A | 89 | 91 | 91 | 91 | 91 |
| | B | 87 | 91 | 91 | 91 | 88 |
| 2.0 | A | 89 | 92 | 92 | 93 | 94 |
| | B | 89 | 92 | 92 | 93 | 93 |
| 5.0 | A | 88 | 88 | 89 | 91 | 93 |
| | B | 86 | 91 | 91 | 92 | 92 |

From the results in this Example, it can be seen that markedly excellent high rate discharge characteristics and storage characteristics are exhibited when the difference (γl–γse) between the surface tension γl of electrolyte and the surface free energy γse of electrode is not more than 10 dynes/cm and the difference (γl–γss) between the surface tension γl of electrolyte and the surface free energy γss of separator is not more than 10 dynes/cm.

Example 3

The positive electrode and the negative electrode constituting the electrode plate group 4 were prepared in the following manner.

<Positive Electrode>

Three parts by weight of acetylene black and 7 parts by weight of fluorocarbon resin binder were mixed with 100 parts by weight of a $LiCoO_2$ powder, and the mixture was suspended in an aqueous carboxymethyl cellulose solution to prepare a paste of positive electrode mix. This paste was coated on an aluminum foil of 30 μm in thickness and dried, followed by rolling to make a positive electrode of 0.18 mm in thickness, 37 mm in width and 390 mm in length.

<Negative Electrode>

A mesophase spherule which was graphitized at a high temperature of 2800° C. (hereinafter referred to as "mesophase graphite") was used. Five parts by weight of styrene-butadiene rubber was mixed with 100 parts by weight of the mesophase graphite, and then the mixture was suspended in an aqueous carboxymethyl cellulose solution to prepare a paste of negative electrode mix. This paste was coated on both sides of a copper foil of 20 μm in thickness and dried, followed by rolling to make a negative electrode of 0.20 mm in thickness, 39 mm in width and 420 mm in length.

A positive electrode lead 5 made of aluminum was attached to the positive electrode and a negative electrode lead 6 made of nickel was attached to the negative electrode, and the positive electrode and the negative electrode with a polypropylene separator of 25 μm in thickness, 45 mm in width and 950 mm in length interposed therebetween were rolled to form a electrode plate group 4. This was inserted in a battery case of 17.0 mm in diameter and 50.0 mm in height. A mixed solution comprising a given non-aqueous electrolyte, a given surface active agent and a given additive was poured in the battery case to complete a battery.

The non-aqueous electrolyte used was one prepared by dissolving 1 mol/liter of $LiPF_6$ in a non-aqueous solvent comprising a mixture of ethylene carbonate and ethylmethyl carbonate at a volume ratio of 1:3.

As shown in Table 6, 0–10.0 parts by weight of the surface active agent (a) shown by the following formula was added to 100 parts by weight of the above non-aqueous electrolyte, and batteries 1–11 were fabricated using the electrolyte. The surface active agent (a) was not used in the battery 1.

$C_8F_{17}-SO_2-N(C_3H_7)-(CH_2-CH_2-O)_{21}-H$

Five batteries from each of the batteries 1–11 were employed and an average value obtained on the five batteries was used in the following evaluation. Each of the batteries was subjected to constant voltage charging under the conditions of an environmental temperature of 20° C., a charging voltage of 4.2 V, a charging time of 2 hours and a limit current of 500 mA. Then, rate characteristics of these batteries of 0.2 C and 1.0 C, namely, relative value of 1.0 C/0.2 C value of each battery when 1.0 C/0.2 C value of the standard battery 1 was assumed to be 100, was determined. The results are shown in Table 6.

0.2 C and 1.0 C represent 5 hour rate discharge capacity and 1 hour rate discharge capacity, respectively. The larger value of 1.0 C/0.2 C shows that the battery is better in load characteristics.

Then, each battery in charging state was stored in a thermostatic chamber at 85° C. for 3 days, and amount of the evolved gases in the battery after stored was determined. The results are also shown in Table 6. The value is a relative value when the amount of gases in the battery 1 is assumed to be 100.

TABLE 6

| No. | Amount [wt %] | Rate characteristics [1.0 C/0.2 C %] | Amount of gas evolved after storing % |
|---|---|---|---|
| 1 | 0 | 100 | 100 |
| 2 | 0.0005 | 100 | 95 |
| 3 | 0.001 | 102 | 88 |
| 4 | 0.005 | 103 | 80 |
| 5 | 0.01 | 105 | 73 |
| 6 | 0.05 | 108 | 55 |
| 7 | 0.1 | 110 | 50 |
| 8 | 0.5 | 105 | 53 |
| 9 | 1.0 | 102 | 69 |
| 10 | 5.0 | 100 | 88 |
| 11 | 10.0 | 95 | 98 |

It can be seen from Table 6 that the rate characteristics of the batteries 3–9 to which the surface active agent (a) was added were superior to those of the battery 1 to which the surface active agent (a) was not added. In addition, it can be seen that the gas evolution in the batteries after stored considerably diminished in the batteries to which the surface active agent (a) was added.

Specifically, when the amount of the surface active agent (a) added was less than 0.001 part by weight, no effect was exhibited, and when it exceeded 5 parts by weight, the rate characteristics deteriorated. However, taking into consideration the evolution of gases, it can be said that addition of it even in an amount of 10 parts by weight gives an effect.

It is considered that the above results can be obtained because addition of the surface active agent (a) to the non-aqueous electrolyte causes sufficient penetration of the non-aqueous electrolyte into the electrode plates of both the positive and negative electrodes to improve wettability between the non-aqueous electrolyte and the electrodes, thereby resulting in enhancement of diffusibility of lithium ion or the like at the interface. Moreover, it can be seen from the decrease of the amount of evolved gas that the electrode reaction proceeds more uniformly.

Example 4

0.1 Part by weight of the surface active agent (a) used in Example 3 and 2 parts by weight of the carbonic acid ester additives shown in Table 7 were added to 100 parts by weight of the non-aqueous electrolyte, and batteries 13–24 were fabricated using these electrolytes. Moreover, battery 12 was fabricated in which only the surface active agent (a) was added to the non-aqueous electrolyte and the carbonic acid ester additives were not added. Furthermore, for comparison, as shown in Table 8, batteries 13'–24' were fabricated in which the surface active agent (a) was not added to the non-aqueous electrolyte and only the carbonic acid ester additives were added. In addition, battery 12' was fabricated in which neither the surface active agent (a) nor the carbonic acid ester additives were used.

Five batteries from each of the batteries 12–24 and batteries 12'–24' were employed and an average value obtained on the five batteries was used in the following evaluation. Each of the batteries was subjected to constant voltage charging under the conditions of a charging voltage of 4.2 V, a charging time of 2 hours, a limit current of 500 mA and an environmental temperature of 20° C., and the amount of gases evolved by the initial charging was determined. The results are shown in Table 7 and Table 8. The value is a relative value when the amount of the evolved gas in the battery 12' is assumed to be 100.

TABLE 7

| No. | Additive | Initial amount of evolved gas in the case of using surface active agent |
|---|---|---|
| 12 | No | 98 |
| 13 | Vinylene carbonate | 70 |
| 14 | Phenylethylene carbonate | 84 |
| 15 | Phenylvinylene carbonate | 79 |
| 16 | Diphenylvinylene carbonate | 88 |
| 17 | Trifluoropropylene carbonate | 90 |
| 18 | Chloroethylene carbonate | 80 |
| 19 | Methoxypropylene carbonate | 88 |
| 20 | Vinylethylene carbonate | 83 |
| 21 | Catechol carbonate | 85 |
| 22 | Tetrahydrofuran carbonate | 93 |
| 23 | Diphenyl carbonate | 82 |
| 24 | Diethyl dicarbonate | 87 |

TABLE 8

| No. | Additive | Initial amount of evolved gas in the case of using surface active agent |
|---|---|---|
| 12' | No | 100 |
| 13' | Vinylene carbonate | 78 |
| 14' | Phenylethylene carbonate | 88 |
| 15' | Phenylvinylene carbonate | 85 |
| 16' | Diphenylvinylene carbonate | 93 |
| 17' | Trifluoropropylene carbonate | 95 |
| 18' | Chloroethylene carbonate | 84 |
| 19' | Methoxypropylene carbonate | 96 |
| 20' | Vinylethylene carbonate | 89 |
| 21' | Catechol carbonate | 92 |
| 22' | Tetrahydrofuran carbonate | 97 |
| 23' | Diphenyl carbonate | 87 |
| 24' | Diethyl dicarbonate | 91 |

The components of the gases evolved were mainly hydrogen, methane, carbon dioxide and the like generated by reductive decomposition or oxidative decomposition of the non-aqueous electrolyte. Evolution of the smaller amount of gases is preferred from the viewpoints of battery characteristics and productivity.

As can be seen from Table 7 and Table 8, the amount of initially evolved gases in the batteries 13–24 which used the carbonic acid ester additives was clearly smaller than in the battery 12 which did not use the carbonic acid ester additives. Furthermore, the amount of gases in the batteries which used the surface active agent (a) was smaller in all the cases than that in the batteries which did not use the surface active agent (a). It is considered that this is because use of the surface active agent (a) and the carbonic acid ester additives in combination causes uniform spread of the carbonic acid ester additives over the surface of the negative electrode due to the action of the surface active agent (a) to improve the wettability and, as a result, the effect to inhibit evolution of gases at the negative electrode can be sufficiently exhibited.

Example 5

0.1 Part by weight of the surface active agent (a) used in Example 3 and 2 parts by weight of the sulfur compound additives shown in Table 9 were added to 100 parts by weight of the non-aqueous electrolyte, and batteries 26–35 were fabricated using these non-aqueous electrolytes.

Moreover, battery 25 was fabricated in which only the surface active agent (a) was added to the non-aqueous electrolyte and the sulfur compound additives were not added. Furthermore, for comparison, as shown in Table 10, batteries 26'–35' were fabricated in which the surface active agent (a) was not added to the non-aqueous electrolyte and only the sulfur compound additives were added. In addition, battery 25' was fabricated in which neither the surface active agent (a) nor the sulfur compound additives were used.

Five batteries from each of the batteries 25–35 and batteries 25'–35' were employed and an average value obtained on the five batteries was used in the following evaluation. Each of the batteries was subjected to constant voltage charging under the conditions of a charging voltage of 4.2 V, a charging time of 2 hours, a limit current of 500 mA and an environmental temperature of 20° C., and each battery in charging state was stored in a thermostatic chamber at 85° C. for 3 days, and amount of the evolved gases in the battery after stored was determined. The results are shown in Table 9 and Table 10. The value is a relative value when the amount of gases evolved in the battery 25' is assumed to be 100.

TABLE 9

| No. | Additive | Amount of evolved gas after storing in the case of using surface active agent |
|---|---|---|
| 25 | No | 50 |
| 26 | Ethylene sulfite | 38 |
| 27 | Ethylene trithiocarbonate | 42 |
| 28 | Vinylene trithiocarbonate | 41 |
| 29 | Catechol sulfite | 38 |
| 30 | Tetrahydrofuran sulfite | 41 |
| 31 | Sulfolane | 36 |
| 32 | 3-Methylsulfolane | 41 |
| 33 | Sulfolene | 38 |
| 34 | Propanesultone | 32 |
| 35 | 1,4-Butanesultone | 41 |

TABLE 10

| No. | Additive | Amount of evolved gas after storing in the case of using no surface active agent |
|---|---|---|
| 25' | No | 100 |
| 26' | Ethylene sulfite | 89 |
| 27' | Ethylene trithiocarbonate | 90 |
| 28' | Vinylene trithiocarbonate | 85 |
| 29' | Catechol sulfite | 78 |
| 30' | Tetrahydrofuran sulfite | 83 |
| 31' | Sulfolane | 75 |
| 32' | 3-Methylsulfolane | 96 |
| 33' | Sulfolene | 80 |
| 34' | Propanesultone | 72 |
| 35' | 1,4-Butanesultone | 87 |

As can be seen from Table 9, the amount of evolved gases in the batteries 26–35 which used the sulfur compound additives was clearly smaller than the amount in the battery 25 which did not use the sulfur compound additives. Furthermore, the amount of evolved gases in the batteries which used the surface active agent (a) was smaller in all the cases than the amount in the batteries which did not use the surface active agent (a). It is considered that this is because use of the surface active agent (a) and the sulfur compound additives in combination causes uniform spread of the sulfur compound additive over the surface of the positive electrode due to the action of the surface active agent (a) and the effect to inhibit evolution of gases at the positive electrode can be sufficiently exhibited.

Example 6

There were used non-aqueous solvents comprising the compounds selected from ethylene carbonate (EC), propylene carbonate (PC) and γ-butyrolactone (GBL) as shown in Table 11. To 100 parts by weight of the non-aqueous solvents was added 0.1 part by weight of the surface active agent (a) used in Example 3, and to a part of them were further added the given amounts of vinylene carbonate (VC) and propanesultone (PS) as additives, and batteries 37, 39, 41, 43 and 45 were fabricated using these non-aqueous solvents.

Furthermore, batteries 36, 38, 40, 42 and 44 were fabricated using the same non-aqueous solvents and additives without using the surface active agent (a).

Five batteries from each of the batteries 36–45 were employed and an average value obtained on the five batteries was used in the following evaluation. Each of the batteries was subjected to constant voltage charging under the conditions of a charging voltage of 4.2 V, a charging time of 2 hours, a limit current of 500 mA and an environmental temperature of 20° C. Rate characteristics of 0.2 C and 1.0 C of these batteries were determined in the same manner as in Example 3. The results are shown in Table 11. The values obtained on batteries 37, 39, 41, 43 and 45 are shown by relative values when the values obtained on batteries 36, 38, 40, 42 and 44 are assumed to be 100.

The batteries were repeatedly subjected to cycles, one cycle of which comprised constant voltage charging under the charging conditions of an environmental temperature of 20° C., a charging voltage of 4.2 V, a charging time of 2 hours and a limit current of 500 mA and discharging under the discharging condition of 1.0 C, and a capacity retention rate at 100th cycle was obtained. The results are shown in Table 11. The values obtained on batteries 37, 39, 41, 43 and 45 are shown by relative values when the values obtained on batteries 36, 38, 40, 42 and 44 are assumed to be 100.

TABLE 11

| No. | Amount of surface active agent [wt %] | Composition of solvent | | | | | Rate characteristics [1.0 C/ 0.2 C %] | Capacity retention rate at 100th cycle [%] |
|---|---|---|---|---|---|---|---|---|
| | | EC | PC | GBL | VC | PS | | |
| 36 | 0 | 40 | | 60 | | | 100 | 100 |
| 37 | 0.1 | 40 | | 60 | | | 107 | 110 |
| 38 | 0 | 35 | 55 | 10 | | | 100 | 100 |
| 39 | 0.1 | 35 | 55 | 10 | | | 112 | 115 |
| 40 | 0 | 50 | 50 | | | | 100 | 100 |
| 41 | 0.1 | 50 | 50 | | | | 118 | 119 |
| 42 | 0 | | | 95 | 5 | | 100 | 100 |
| 43 | 0.1 | | | 95 | 5 | | 122 | 128 |
| 44 | 0 | | | 95 | 3 | 2 | 100 | 100 |
| 45 | 0.1 | | | 95 | 3 | 2 | 126 | 130 |

It can be seen from Table 11 that rate characteristics and capacity retention rate at 100th cycle of the batteries 37, 39, 41, 43 and 45 were superior to those of the batteries 36, 38, 40, 42 and 44 in which the surface active agent was not used.

As can be seen from the above results, addition of the surface active agent (a) can solve the problem that the non-aqueous electrolyte can hardly penetrate into electrodes or separators in the case of using solvents of high specific permittivity such as propylene carbonate (specific permittivity=64.9), γ-butyrolactone (specific permittivity=39.1) and ethylene carbonate (specific permittivity=89.1). Therefore, according to the present invention, non-aqueous electrolyte secondary batteries superior in electrical characteristics can be obtained using solvents of high specific permittivity.

Example 7

A negative electrode 6 was made by mixing 75% by weight of an artificial graphite powder, 20% by weight of a carbon powder as a conducting agent and 5% by weight of a polyvinylidene fluoride resin as a binder, dispersing the mixture in dehydrated N-methylpyrrolidinone to prepare a slurry, coating the slurry on a negative electrode current collector comprising a copper foil, drying the coat and then rolling the coated foil. (Negative electrode plate of Example 2).

A positive electrode 5 was made by mixing 85% by weight of a lithium cobaltate powder, 10% by weight of a carbon powder as a conducting agent and 5% by weight of a polyvinylidene fluoride resin as a binder, dispersing the mixture in dehydrated N-methylpyrrolidinone to prepare a slurry, coating the slurry on a positive electrode current collector comprising an aluminum foil, drying the coat and rolling the coated foil. (Positive electrode plate A in Example 1).

The thus obtained electrode plate group was put in a battery case, and a non-aqueous electrolyte comprising a combination of the cyclic compound and the electrolyte salt as shown in Table 12 was poured in the battery case to make a battery by way of trial. This cylindrical battery had a diameter of 17 mm and a height of 50 mm.

The batteries made were repeatedly subjected to charging and discharging cycles, one cycle of which comprised charging at a constant current of 100 mA until the voltage reached 4.1 V and then discharging at a constant current of 100 mA until the voltage reached 2.0 V. In this case, 200 cycles of charging and discharging were repeatedly carried out, and the initial discharge capacity and the discharge capacity at the 200th cycle are shown in Table 13. Furthermore, the batteries having the same construction as above were charged at a constant current of 100 mA until the voltage reached 4.1 V and once discharged until the voltage reached 2.0 V, and the initial battery capacity was checked. Thereafter, they were again charged under the same conditions until the voltage reached 4.1 V, and stored at 60° C. for 20 days. Discharge capacity of the batteries after stored and amount of gases collected in liquid paraffin through a hole made in the batteries after stored are also shown in Table 13.

TABLE 12

| | Composition of electrolyte (volume ratio) | Solute (solute and concentration) | Surface active agent (amount and kind) |
|---|---|---|---|
| Battery 1 | Ethylene carbonate/γ-valerolactone = 1/4 | 1.0 M LiPF$_6$ | 0.05 wt % $C_8F_{17}SO_2N(C_3H_7)CH_2CH_2O$—$(CH_2CH_2O)_{10}H$ |
| Battery 2 | Vinylene carbonate/γ-butyrolactone = 1/4 | 1.0 M LiPF$_6$ | 0.05 wt % $C_8F_{17}SO_2N(C_3H_7)CH_2CH_2O$—$(CH_2CH_2O)_{10}H$ |
| Battery 3 | Vinylene carbonate/butylene carbonate = 1/3 | 1.0 M LiPF$_6$ | 0.05 wt % $C_8F_{17}SO_2N(C_3H_7)CH_2CH_2O$—$(CH_2CH_2O)_{10}H$ |
| Battery 4 | Ethylene phosphate/propylene carbonate = 1/1 | 1.0 M LiPF$_6$ | 0.05 wt % $C_8F_{17}SO_2N(C_3H_7)CH_2CH_2O$—$(CH_2CH_2O)_{10}H$ |
| Battery 5 | Succinic anhydride/trimethylene borate = 1/4 | 1.0 M LiPF$_6$ | 0.05 wt % $C_8F_{17}SO_2N(C_3H_7)CH_2CH_2O$—$(CH_2CH_2O)_{10}H$ |
| Battery 6 | 4,5-Diphenyl(1,3,2)-dioxathiol 2,2-dioxide/1,3-dioxane 2-one = 1/1 | 1.0 M LiPF$_6$ | 0.05 wt % $C_8F_{17}SO_2N(C_3H_7)CH_2CH_2O$—$(CH_2CH_2O)_{10}H$ |
| Battery 7 | Ethylene phosphite/propanesultone = 5/1 | 1.0 M LiPF$_6$ | 0.05 wt % $C_8F_{17}SO_2N(C_3H_7)CH_2CH_2O$—$(CH_2CH_2O)_{10}H$ |
| Battery 8 | Phthalic anhydride/γ butyrolactone = 1/4 | 1.0 M LiPF$_6$ | 0.05 wt % $C_8F_{17}SO_2N(C_3H_7)CH_2CH_2O$—$(CH_2CH_2O)_{10}H$ |
| Battery 9 | Itaconic anhydride/propylene carbonate = 1/3 | 1.0 M LiPF$_6$ | 0.05 wt % $C_8F_{17}SO_2N(C_3H_7)CH_2CH_2O$—$(CH_2CH_2O)_{10}H$ |
| Battery 10 | Citraconic anhydride/tetrahydrofuran = 1/4 | 1.0 M LiPF$_6$ | 0.05 wt % $C_8F_{17}SO_2N(C_3H_7)CH_2CH_2O$—$(CH_2CH_2O)_{10}H$ |
| Battery 11 | Succinic anhydride/trimethylene borate = 1/4 | 1.0 M LiN$(C_2F_5SO_2)_2$ | 0.05 wt % $C_8F_{17}SO_2N(C_3H_7)CH_2CH_2O$—$(CH_2CH_2O)_{10}H$ |
| Battery 12 | Succinic anhydride/trimethylene borate = 1/4 | 1.0 M LiBF$_4$ | 0.05 wt % $C_8F_{17}SO_2N(C_3H_7)CH_2CH_2O$—$(CH_2CH_2O)_{10}H$ |
| Battery 13 | Succinic anhydride/trimethylene borate = 1/4 | 1.0 M Lithium bis(2,2'-biphenyl-dioleat(2-)-O,O')borate | 0.05 wt % $C_8F_{17}SO_2N(C_3H_7)CH_2CH_2O$—$(CH_2CH_2O)_{10}H$ |
| Battery 14 | Succinic anhydride/trimethylene borate = 1/4 | 1.0 M LiN$(CF_3SO_2)(C_4F_9SO_2)$ | 0.05 wt % $C_8F_{17}SO_2N(C_3H_7)CH_2CH_2O$—$(CH_2CH_2O)_{10}H$ |
| Battery 15 | Vinylene carbonate/γ-butyrolactone/isatonic anhydride = 1/4/1 | 1.0 M LiPF$_6$ | 0.05 wt % $C_8F_{17}SO_2N(C_3H_7)CH_2CH_2O$—$(CH_2CH_2O)_{10}H$ |
| Battery | Propylene carbonate | 1.0 M | 0.05 wt % |

TABLE 12-continued

| | Composition of electrolyte (volume ratio) | Solute (solute and concentration) | Surface active agent (amount and kind) |
|---|---|---|---|
| Battery 16 | | LiPF$_6$ 1.0 M | C$_8$F$_{17}$SO$_2$N(C$_3$H$_7$)CH$_2$CH$_2$O—(CH$_2$CH$_2$O)$_{10}$H 0.05 wt % |
| Battery 17 | γ-Butyrolactone | LiPF$_6$ 1.0 M | C$_8$F$_{17}$SO$_2$N(C$_3$H$_7$)CH$_2$CH$_2$O—(CH$_2$CH$_2$O)$_{10}$H 0.05 wt % |
| Battery 18 | Ethylene carbonate/ dimethyl carbonate = 1/3 | LiPF$_6$ 1.0 M | C$_8$F$_{17}$SO$_2$N(C$_3$H$_7$)CH$_2$CH$_2$O—(CH$_2$CH$_2$O)$_{10}$H No |
| Battery 19 | Vinylene carbonate/γ-butyrolactone = 1/4 | LiPF$_6$ | |

TABLE 13

| | Initial capacity/mAh | Capacity at 200th cycle/mAh | Capacity after storing/mAh | Amount of gas after storing/ml |
|---|---|---|---|---|
| Battery 1 | 720 | 718 | 718 | 0.4 |
| Battery 2 | 728 | 725 | 726 | 0.5 |
| Battery 3 | 718 | 713 | 714 | 0.4 |
| Battery 4 | 707 | 700 | 703 | 0.8 |
| Battery 5 | 723 | 716 | 719 | 0.7 |
| Battery 6 | 734 | 722 | 726 | 0.5 |
| Battery 7 | 702 | 691 | 700 | 0.6 |
| Battery 8 | 736 | 732 | 734 | 0.7 |
| Battery 9 | 699 | 690 | 694 | 0.7 |
| Battery 10 | 711 | 707 | 709 | 0.9 |
| Battery 11 | 748 | 745 | 747 | 0.3 |
| Battery 12 | 747 | 744 | 745 | 0.4 |
| Battery 13 | 748 | 744 | 744 | 0.3 |
| Battery 14 | 746 | 745 | 744 | 0.5 |
| Battery 15 | 740 | 736 | 739 | 0.5 |
| Battery 16 | Charging and discharging were impossible | — | — | — |
| Battery 17 | 100 | 0 | 18 | 28.2 |
| Battery 18 | 750 | 684 | 653 | 1.6 |
| Battery 19 | 719 | 687 | 692 | 2.8 |

As shown in Table 13, the present invention can provide lithium secondary batteries which hardly evolve gases, and are excellent in cycle life and high-temperature storage characteristics and high in reliability. The amount of the surface active agent added is preferably 0.00001–1 wt %, more preferably 0.00001–0.3 wt %.

In this example, lithium cobaltate was used as the positive electrode material, but it is clear that the similar effects can also be obtained using other transition metal oxides such as lithium nickelate and lithium manganate or transition metal sulfides such as titanium disulfide and molybdenum disulfide. Furthermore, in this example, artificial graphite was used as the negative electrode material, but it is clear that the similar effects can also be obtained using metallic lithium, lithium alloys and lithium compounds and carbon materials other than the artificial graphite which are capable of absorbing and releasing lithium without modification of the essence of the invention.

Furthermore, as the method of making the electrodes, there may be employed any methods as far as they do not affect the essence of the present invention, and the invention is not limited to this example.

Moreover, combination and mixing ratio of the electrolytes and amounts of the solutes employed in this example are not determined without variation, but optional combinations, mixing ratios and amounts can be employed and the similar effects can also be obtained. However, as for the solutes, the kind thereof must be selected depending on the positive electrode material used from the point of the voltage against oxidation.

As explained above, according to the present invention, since the electrodes and separators are uniformly wetted with the non-aqueous electrolyte, the reaction distribution is uniform, and, as a result, novel non-aqueous electrochemical apparatuses excellent in high rate charge and discharge characteristics and storage characteristics are obtained.

According to the present invention, lithium secondary batteries high in load characteristics, less in evolution of gases and excellent in charge and discharge characteristics and cycle life can be provided by improving the wettability between the non-aqueous electrolyte and the electrodes and enhancing diffusibility of ions at the interface thereof.

Moreover, according to the present invention, ester interchange reaction hardly takes place, namely, alkoxide radicals which are strong nucleophilic reagents are hardly produced, and chemical stability of the non-aqueous electrolyte is enhanced, and, as a result, evolution of gas during charging and storage at high temperatures and deterioration of characteristics caused by dissolution of active materials, particularly, metals in positive electrode materials, can be inhibited. Thus, there are obtained non-aqueous electrolyte secondary batteries which can be used in a wide temperature range, are high in energy density, less in deterioration of discharge capacity caused by repeated use of the batteries, and excellent in high rate charge and discharge characteristics.

What is claimed is:

1. A non-aqueous electrochemical apparatus where the difference (γl–γse) between the surface tension γl of electrolyte and the surface free energy γse of electrode is not more than 10 dynes/cm, wherein γl is more than γse.

2. A non-aqueous electrochemical apparatus where the difference (γl–γss) between the surface tension γl of electrolyte and the surface free energy γss of separator interposed between electrodes is not more than 10 dynes/cm, wherein γl is more than γss.

3. A non-aqueous electrochemical apparatus where the difference (γl–γse) between the surface tension γl of electrolyte and the surface free energy γse of electrode is not more than 10 dynes/cm and the difference (γl–γss) between the surface tension γl of electrolyte and the surface free energy γss of separator is not more than 10 dynes/cm, wherein γl is more than γse and γl is more than γss.

4. A non-aqueous electrochemical apparatus according to claim 1, wherein the surface tension γl of electrolyte is 10–45 dynes/cm.

5. A non-aqueous electrochemical apparatus comprising solid elements having a surface free energy of 1–35 dynes/cm where the surface tension of electrolyte is 10–45 dynes/cm and is greater than the surface free energy of the solid elements.

6. A non-aqueous electrochemical apparatus according to claim 5, wherein the solid elements are electrodes containing a carbon material.

7. A non-aqueous electrochemical apparatus according to claim 6, wherein the electrolyte comprises a surface active agent.

8. A non-aqueous electrochemical apparatus according to claim 7, wherein the surface active agent is a fluorine-containing surface active agent.

9. A non-aqueous electrochemical apparatus according to claim 8, wherein the fluorine-containing surface active agent comprises at least one compound selected from the group consisting of fluoroalkyl(C2–C20)carboxylic acids, disodium N-perfluorooctanesulfonylglutamate, sodium 3-[fluoroalkyl(C6–C11)oxy]-1-alkyl(C3–C4)sulfonate, sodium 3-ω-[fluoroalkanoyl(C6–C8)-N-ethylamino]-1-propanesulfonate, N-[3-(perfluorooctanesulfonamide)propyl]-N,N-dimethyl-N-carboxymethylene ammonium betaine, perfluoroalkylcarboxylic acids (C7–C13), perfluorooctanesulfonic acid diethanolamide, perfluoroalkyl (C4–C12)sulfonates (Li, Na, K), N-propyl-N-(2-hydroxyethyl)perfluorooctanesulfonamide, perfluoroalkyl (C6–C10)sulfonamidopropyltrimethylammonium salts, perfluoroalkyl(C6–C10)-N-ethylsulfonylglycine salts (K), bis(N-perfluorooctylsulfonyl-N-ethylaminoethyl)phosphate, monoperfluoroalkyl(C6–C16)ethylphosphoric acid esters, and perfluoroalkylethylene oxide adducts.

10. A non-aqueous electrochemical apparatus according to claim 9, wherein the fluorine-containing surface active agent is shown by the formula (1): $C_nF_{2n+1}SO_2N(C_mH_{2m+1})CH_2CH_2O(CH_2CH_2O)_lH$ in which n is 4–18, m is 1–4, and l is 5–25.

11. A non-aqueous electrochemical apparatus according to claim 9, wherein the fluorine-containing surface active agent is shown by the formula (2): $C_nF_{2n+1}$—X—$(CH_2$—$CH_2$—$O(_m$—Y in which —X— is —CONH— or —$SO_2$NR— (R is an alkyl group of 1–8 carbon atoms), —Y is —H, —OH, —$CH_3$, —$PO_3W_2$ or —$SO_3W$ (W is an alkali metal), n is 3–10, and m is 2–100.

12. A non-aqueous electrochemical apparatus according to claim 7, wherein the solid elements comprise a negative electrode containing a carbon material and a positive electrode containing a lithium-containing metal oxide, and the electrolyte contains a non-aqueous solvent, a solute and a fluorine-containing surface active agent, said non-aqueous solvent comprising at least one compound selected from the group consisting of ethylene carbonate, propylene carbonate, ethylmethyl carbonate, diethyl carbonate, dimethyl carbonate, γ-butyrolactone, γ-valerolactone, α-acetyl-γ-butyrolactone, α-methyl-γ-butyrolactone, methyl acetate, ethyl acetate, methyl propionate, ethyl butyrate, butyl acetate, n-propyl acetate, isobutyl propionate and benzyl acetate.

13. A non-aqueous electrochemical apparatus according to claim 12, wherein 80% by volume or more of the non-aqueous solvent comprises at least one non-aqueous solvent selected from the group consisting of propylene carbonate and γ-butyrolactone.

14. A non-aqueous electrochemical apparatus according to claim 7, wherein the non-aqueous electrolyte additionally contains a carbonic acid ester additive or a sulfur compound additive.

15. A non-aqueous electrochemical apparatus according to claim 7, wherein the non-aqueous electrolyte contains a non-aqueous solvent, a solute and a surface active agent, and the non-aqueous solvent contains a plurality of cyclic compounds and the solute is a compound containing lithium as a cation component.

16. A non-aqueous electrochemical apparatus according to claim 15, wherein the plurality of cyclic compounds is a mixture of at least two compounds selected from the group consisting of cyclic esters, cyclic ethers, cyclic acid anhydxides and derivatives of these compounds.

17. A non-aqueous electrochemical apparatus according to claim 15, wherein the surface active agent is a fluorine-containing surface active agent.

18. A non-aqueous electrochemical apparatus according to claim 16, wherein at least one of a plurality of the cyclic compounds has a melting point of not higher than −20° C.

19. A non-aqueous electrochemical apparatus according to claim 16, wherein the cyclic ester is selected from the group consisting of cyclic carbonic acid esters, cyclic carboxylic acid eaters, cyclic phosphoric acid esters, cyclic phosphorous acid esters, cyclic boric acid esters, cyclic sulfurous acid esters, cyclic sulfuric acid esters, cyclic nitrous acid esters, cyclic nitric acid esters, and cyclic silicic acid esters.

20. A non-aqueous electrochemical apparatus according to claim 15, wherein the solute contains at least one compound selected from the group consisting of lithium hexafluorophosphate ($LiPF_6$) and lithium tetrafluoroborate ($LiBF_4$) and at least one compound selected from the group consisting of lithium bistrifluorozuethanesulfonimide (($CF_3SO_2)_2NLi$) having the following structural formula (3) and lithium bispentafluoroethanesulfonimide (($C_2F_5SO_2)_2NLi$) having the following structural formula (4):

21. A non-aqueous electrochemical apparatus according to claim 14, wherein the carbonic acid ester additive comprises at least one compound selected from the group consisting of vinylene carbonate, phenylethylene carbonate, phenylvinylene carbonate, diphenylvinylene carbonate, trifluoropropylene carbonate, chloroethylene carbonate, methoxypropylene carbonate, vinylethylene carbonate, catechol carbonate, tetrahydrofuran carbonate, diphenyl carbonate, and diethyl dicarbonate.

22. A non-aqueous electrochemical apparatus according to claim 14, wherein the sulfur compound additive comprises at least one compound selected from the group consisting of ethylene sulfite, ethylene trithiocarbonate, vinylene trithiocarbonate, catechol sulfite, tetrahydrofuran sulfite, sulfolane, 3-methylsulfolane, sulfolene, propanesultone, and 1,4-butanesultone.

23. A non-aqueous electrochemical apparatus according to claim 2, wherein the surface tension γl of electrolyte is 10–45 dynes/cm.

24. A non-aqueous electrochemical apparatus according to claim 3, wherein the surface tension γl of the electrolyte is 10–45 dynes/cm.

25. A non-aqueous electrochemical apparatus comprising a fluorine-containing surface active agent according to formula (2) $C_nF_{2n+1}$—X—$(CH_2$—$CH_2$—$O)_m$—Y in which —X— is —CONH—, —Y is —H, —OH, —$CH_3$, —$PO_3W_2$ or —$SO_3W$ (W is an alkali metal), n is 3–10, and m is 2–100.

26. A non-aqueous chemical apparatus according to claim 11, wherein —X— is —CONH—.

27. A non-aqueous electrochemical apparatus comprising solid elements having a surface free energy of 1–35 dynes/cm where the surface tension of electrolyte is 10–45 dynes/cm, wherein the solid elements are electrodes containing a carbon material; and the electrolyte contains a fluorine-containing surface active agent, comprising at least one compound selected from the group consisting of fluoroalkyl (C2–C20)carboxylic acids, disodium N-perfluorooctanesulfonylglutamate, sodium 3-[fluoroalkyl(C6–C11)oxy]-1-alkyl(C3–C4)sulfonate, sodium 3-[ω-fluoroalkanoyl(C6–C8)-N-ethylamino]-1-propanesulfonate, N-[3-(perfluorooctanesulfonamide)propyl]-N,N-dimethyl-N-carboxymethylene ammonium betaine, perfluoroalkylcarboxylic acids (C7–C13), perfluorooctanesulfonic acid diethanolamide, perfluoroalkyl (C4–C12)sulfonates (Li, Na, K), N-propyl-N-(2-hydroxyethyl)perfluorooctanesulfonamide, perfluoroalkyl(C6–C10)sulfonamidopropyltrimethylammonium salts, perfluoroalkyl(C6–C10)-N-ethylsulfonylglycine salts (K), bis(N-perfluorooctylsulfonyl-N-ethylaminoethyl) phosphate, monoperfluoroalkyl(C6–C16) ethylphosphoric acid esters, and perflucroalkylethylene oxide adducts, wherein the fluorine-containing surface active agent is shown by the formula (2): $C_nF_{2n+1}$—X—$(CH_2$—$CH_2$—$O)_m$—Y in which —Y is —H, —OH, —$CH_3$, —$PO_3W_2$ or —$SO_3W$ (W is an alkali metal), n is 3–10, and m is 2–100, and —X— is —CONH—.

* * * * *